US00RE43233E

(19) United States
(12) Reissued Patent
Venegas, Jr.

(10) Patent Number: US RE43,233 E
(45) Date of Reissued Patent: Mar. 13, 2012

(54) CART CORRAL

(76) Inventor: Frank Venegas, Jr., Brighton, MI (US)

(21) Appl. No.: 09/771,227

(22) Filed: Jan. 26, 2001

Related U.S. Patent Documents

Reissue of:
(64) Patent No.: 5,862,921
Issued: Jan. 26, 1999
Appl. No.: 08/850,886
Filed: May 2, 1997

(51) Int. Cl.
*A47F 5/00* (2006.01)

(52) U.S. Cl. ..... 211/17; 211/13; 211/22; 211/195; 256/1; 256/24; 256/25; 256/65; 52/653.2; D25/15; D25/18

(58) Field of Classification Search ..... 52/653.2, 52/648; 211/17, 22, 189; 256/1, 59, 24–26, 256/32, 33; 119/512; D25/15, 18; 135/121
See application file for complete search history.

(56) References Cited

U.S. PATENT DOCUMENTS 2,819,755 A * 1/1958 Berger et al. ..... 482/69
4,236,697 A * 12/1980 Savino ..... 256/1
4,461,461 A * 7/1984 Caron ..... 256/19
4,523,768 A 6/1985 Dlubala ..... 280/42
4,609,183 A * 9/1986 Ulmer ..... 256/1
D321,798 S * 11/1991 Buckley ..... D6/462
5,201,426 A * 4/1993 Cruwell, Jr. ..... 211/17
5,354,036 A * 10/1994 Brown ..... 256/25
D361,448 S * 8/1995 Buckley ..... D6/462
5,551,578 A 9/1996 McCue et al. ..... 211/17
5,598,668 A * 2/1997 Isom ..... 52/86
5,657,887 A * 8/1997 Smith ..... 211/189
5,661,942 A * 9/1997 Palmer ..... 52/653.2

* cited by examiner

*Primary Examiner* — Mark Wendell
(74) *Attorney, Agent, or Firm* — Gifford, Krass, Sprinkle, Anderson & Citkowski, P.C.

(57) ABSTRACT

The present invention provides a cart corral assembly of the type employed by stores, such as grocery stores, to encourage the consumer to temporarily store grocery carts in the parking lot before bringing the cart within the store structure. The cart corral includes a first set of two spaced apart vertical rails in a base support extended between these rails. The base support supports the vertical rails in an upright position. At least two spaced apart horizontal rails are provided and are removably engaged with the vertical rails in a position [abut] *above* the base support. [The horizontal rails form an obtuse angle with the vertical rails.] A second set of two spaced apart vertical rails are provided opposite the first set of vertical rails and are removably engaged with the horizontal rails. A second base support extends between the second set of vertical rails and supports the vertical rails in an upright position. Removable and replaceable polymerized sheathing surrounds each of the vertical and horizontal rails. The polymerized sheathing has an inner diameter equal to or greater than the outer diameter of the vertical and horizontal rails. Removable slip-on structural fittings are provided for removably connecting the vertical and horizontal rails to each other.

36 Claims, 3 Drawing Sheets

CART CORRAL

Matter enclosed in heavy brackets [ ] appears in the original patent but forms no part of this reissue specification; matter printed in italics indicates the additions made by reissue.

BACKGROUND OF THE INVENTION

I. Field of the Invention

The present invention is directed to a cart corral of the type employed by supermarkets and the like to store carts, such as grocery carts, in a parking lot.

II. Description of the Related Art

Tubular steel cart corrals are commonly used in parking lots for temporary storage of carts, such as grocery carts, prior to removing the carts to within the store or a storage structure. Steel tubular cart corrals are a relatively new element provided by stores to aid in preventing carts from damaging vehicles parked in the parking lot. The cart corral was developed to encourage consumers to park the carts within the corral structure after emptying the contents of their cart within their vehicle. By providing a cart corral, store owners hope to eliminate the problem of runaway carts and stray carts scattered throughout the parking structure. That is, consumers generally attempted to park their cart at all different angles to prevent the cart from rolling downhill and smashing into other vehicles after the consumer had emptied his goods from the cart into his vehicle.

A disadvantage of these previously known steel tubing cart corrals is that they require maintenance because they rust. A further disadvantage of currently available steel cart corrals is that once they are assembled, they essentially become fixed in that location. A still further disadvantage of currently available steel cart corrals is that once they are assembled and assume a certain profile, they cannot be disassembled and readily reassembled to conform to a differently shaped cart corral. Hence, although such steel cart corral assemblies exist, they are high maintenance and are not easily removed from one location and reassembled in another location.

SUMMARY OF THE INVENTION

The present invention provides a knock down cart corral assembly which is readily and easily assembled and disassembled. The cart corral assembly of the present invention includes a steel subframe surrounded by polymerized sheathing.

More particularly, the cart corral system of the present invention comprises at least two spaced apart vertical rails having a base support extending between the vertical rails and supporting the vertical rails in an upright position. At least two spaced apart horizontal rails are provided and are removably engageable with the vertical rails. The horizontal rails are positioned above the base support and preferably form a right angle with the vertical rails.

A second set of spaced apart vertical rails are also provided opposite the first set of vertical rails and are removably engaged with the horizontal rails at the opposite end. A base support extends between the second set of vertical rails to support the vertical rails in an upright position.

In a first preferred embodiment, a second set of horizontal rails are provided to extend between the second set of vertical rails thereby forming a barrier at one end of the cart corral to prevent carts from rolling out one end of the cart corral. These vertical and horizontal rails form the steel subframe of the cart corral of the present invention.

Removable and replaceable polymerized sheathing surrounds each of the vertical and horizontal rails. Preferably, the sheathing has an interior diameter equal to or greater than the outer diameter of the vertical and horizontal rails and extends completely about the subframe of the cart corral.

In each preferred embodiment of the cart corral of the present invention, the vertical and horizontal rails are removably engaged to each other by slip-on structural fittings such as those provided by Hollaender Manufacturing, Cincinnati, Ohio. These slip-on structural fittings are preferably formed in T-shaped, L-shaped, and multi-angled configurations.

In a second preferred embodiment of the cart corral of the present invention, additional vertical and horizontal rails are provided therewith to create a duo-alley, or multiple alley cart corral system. That is, the second preferred embodiment provides at least two chutes with a closed end for rolling a cart into for temporary storage. In this second preferred embodiment, the vertical and horizontal rails of the steel subframe are surrounded by polymerized sheathing extending about the entire subframe. The polymerized sheathing preferably has an interior diameter equal to or greater than the outer diameter of the vertical and horizontal rails. Additionally, the vertical and horizontal rails with polymerized sheathing are removably engaged to each other by slip-on structural fittings such as those provided by Hollaender Manufacturing, Cincinnati, Ohio.

In a third preferred embodiment of the cart corral of the present invention, the horizontal rails are preferably bent at a 90° angle at one end to form a rounded corner that merges into the vertical rails. Additionally, at the opposite end, the second set of vertical rails extends beyond the slip-on structural fittings and is rounded to create a single arcuate vertical rail. That is, rather than providing an additional horizontal rail between two vertical rails, this preferred embodiment provides a single vertical rail extending from a vertical to a horizontal position and returning back to a vertical position thereby creating an arch-like effect. This third preferred embodiment is also preferably surrounded by polymerized sheathing extending along the entire steel sub-frame. This polymerized sheathing preferably has an interior diameter equal to or greater than the outer diameter of the vertical and horizontal rails. Additionally, slip-on structural fittings such as those provided by Hollaender Manufacturing, Cincinnati, Ohio, are used for removable connection of each of the vertical and horizontal rails.

The advantages of the present invention are many. The present invention provides a maintenance free, readily assembled and disassembled cart corral assembly. The addition of the polymerized sheathing to the metal substructure eliminates maintenance such as painting that is required of standard metal structures.

The cart corral assembly of the present invention can be used for many applications and can be made in any color plastic sheathing and slip-on structural fittings. This plastic sheathing can also include warning signs or any indicia that may be preferred.

As stated above, in alternative embodiments, a plurality of sheaths, horizontal and vertical rails can be used. These and other objects, advantages and features of this invention will become apparent upon review of the following specification in conjunction with the drawings.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENTS

Figure 1:
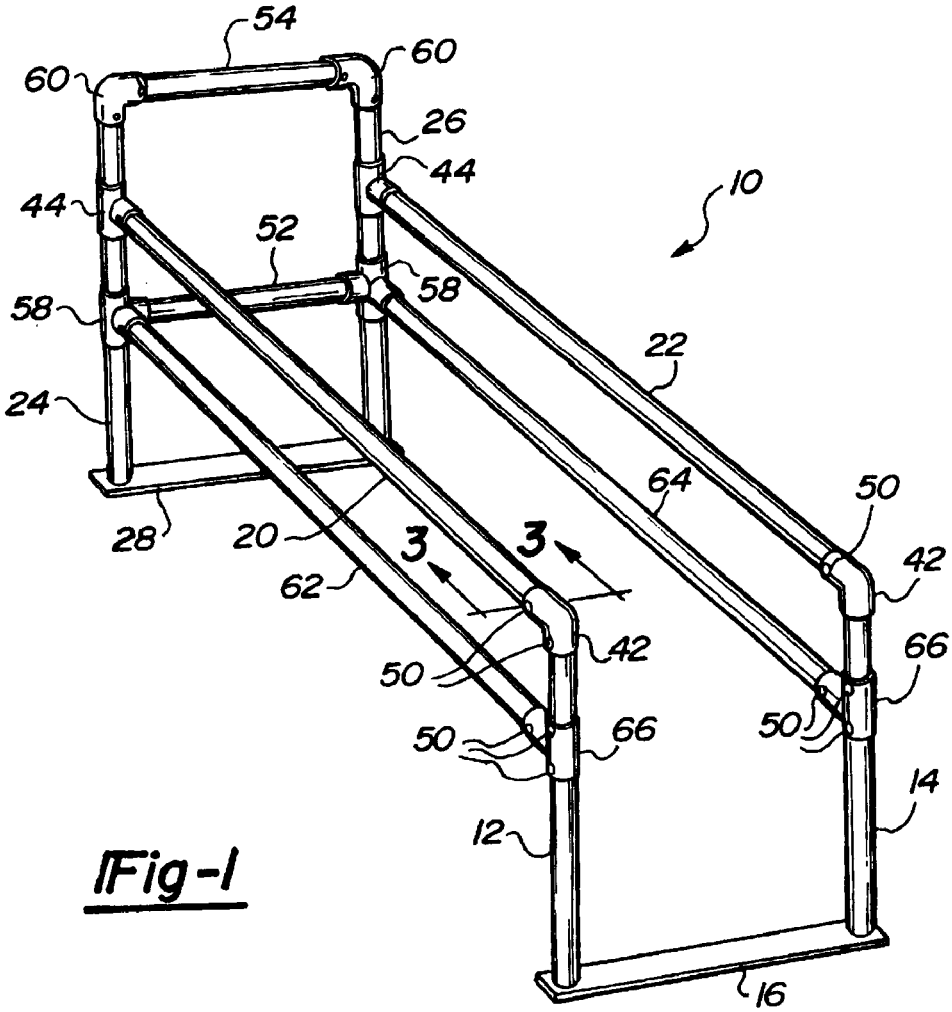
FIG. 1 is a perspective view of a cart corral assembly in accordance with the present invention.

Referring now to the drawings and the embodiments illustrated therein, FIG. 1 shows a cart corral assembly 10 having a first set of two spaced apart vertical rails 12, 14. A base 16 extends between the two vertical rails 12, 14 for supporting the vertical rails 12, 14 in an upright position. Base 16 is fitted with tongue 18 that extend at a 90° angle to base 16 for supporting vertical rails 12, 14 in an upright position. (See FIG. 2.)

Two spaced apart horizontal rails 20, 22 are removably engaged with vertical rails 12, 14 and positioned above base support 16. Horizontal rails 20, 22 preferably form a 90° angle with vertical rails 12, 14.

A second set of spaced apart vertical rails 24, 26 are placed opposite first set of vertical rails 12, 14 and are removably engaged with horizontal rails 20, 22. A second base support 28 extends between the second set of vertical rails 24, 26 and supports these rails in an upright position. Base 28 also includes a set of tongues 30 fixedly attached to the base 28 and extending at a 90° angle from base 28 to support vertical rails 24, 26 in an upright position. (See FIG. 2.)

Figure 2:
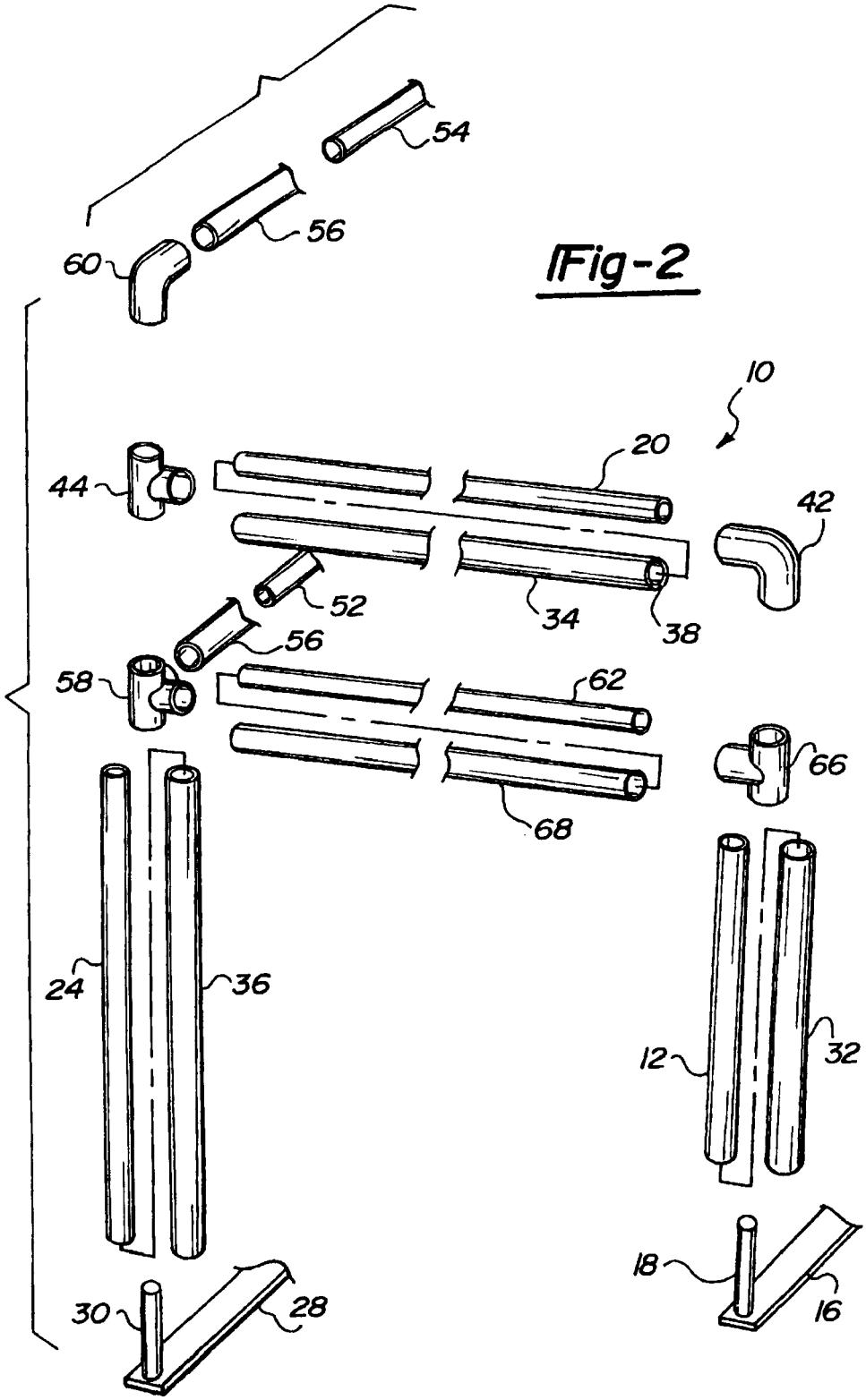
FIG. 2 is an exploded view of the front section of the cart corral assembly in accordance with the present invention.

Polymerized sheathing is provided for surrounding each horizontal and vertical rail. With reference particularly to FIG. 2, polymerized sheathing 32, 34, 36 is thereshown surrounding corresponding vertical and horizontal rails 12, 20, 24. As is best shown in FIG. 2, polymerized sheathing 32, 34, 36 preferably extends the full length of each corresponding rail.

Figure 3:
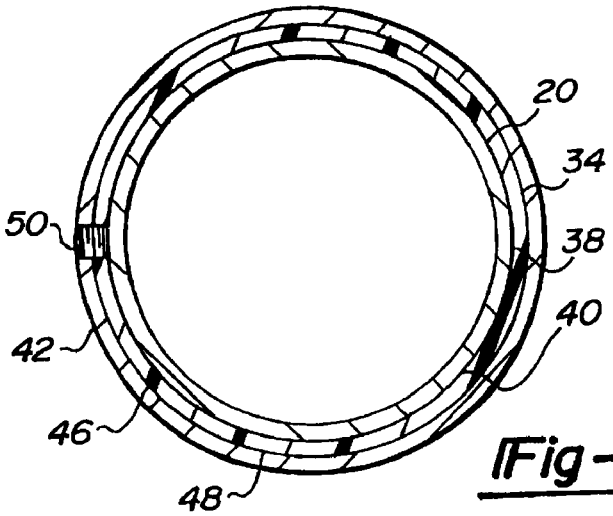
FIG. 3 is a cross-sectional view taken along line 3-3 of FIG. 1.

With reference to FIG. 3, horizontal rail 20 is thereshown surrounded by polymerized sheathing 34. As is typical with all rails and sheathing, polymerized sheathing 34 has an interior diameter 38 equal to or greater than the exterior diameter 40 of horizontal rail 20 to create a slip fit.

With reference now to FIGS. 1 and 2, horizontal rails 20, 22 are removably engaged with vertical rails 12, 14, 24, 26 by Hollaender slip-on structural fittings 42, 44. As is typically shown in FIG. 3, Hollaender slip-on structural fitting 42 preferably has an interior diameter 46 equal to or greater than the exterior diameter 48 of polymerized sheathing 34. Hollaender slip-on structural fitting 42 is securely fastened to polymerized sheathing 34 of horizontal rail 20 by set screw 50. Any type of fastening device may be used, however, when using a Hollaender slip-on structural fitting, the fitting shall be preferably secured to polymerized sheath 34 by knurled cup-point set screws.

In an alternative embodiment, vertical rails 24, 26 in corresponding polymerized sheathing 36 extends above horizontal rails 20, 22 in corresponding polymerized sheathing 34. A second set of horizontal rails 52, 54 are provided therewith and are preferably spaced apart between second vertical rails 24, 26. With reference to FIG. 2, like all other rails provided in the present invention, horizontal rails 52, 54 are surrounded by polymerized sheathing 56 preferably extending the entire length of horizontal rails 52, 54 and having an interior diameter equal to or greater than the exterior diameter of horizontal rails 52, 54. Hollaender slip-on fittings 58, 60 are provided therewith for supporting horizontal rails 52, 54 to vertical rails 24, 26 by the identical structure illustrated in FIG. 3 and stated above.

Hollaender slip-on fittings 58 are provided with triangularly shaped members for supporting a third set of horizontal rails 62, 64 in a third preferred embodiment of the present invention. Horizontal rails 62, 64 are removably engaged to vertical rails 12, 14 by Hollaender slip-on structural fitting 66. Horizontal rails 62, 64 are surrounded by polymerized sheathing 68 as best shown in FIG. 2. As stated above, polymerized sheathing 68 preferably has an interior diameter equal to or greater than the exterior diameter of third horizontal rail 62 to create a slip fit. Hollaender fittings 66 secure horizontal rails 62, 64 in position by set screws as previously shown and described in FIG. 3.

With reference now to FIG. 2, a section of the cart corral 10 is thereshown in an exploded view showing detail of the readily assembled and disassembled cart corral system. Specifically, base 16, 28 are provided therewith having corresponding tongues 18, 30 fixedly attached to base 16, 28 preferably at a 90° angle. Vertical rails 12, 24 are placed on corresponding tongues 18, 30 for support in upright position.

Polymerized sheathing 32, 36 is then slip-fit about corresponding rails 12, 24. Hollaender fittings 58, 66 are then slipped over corresponding polymerized sheathing 36, 32 to be fixed in position layer. As best shown in FIGS. 1 and 2, slip on structural fitting 58 is formed of a triangled arrangement for providing support of a multiplicity of rails. Slip-on structural fittings 66 is preferably T-shaped for supporting a single horizontal rail 62 with polymerized sheathing 68 about vertical rail 12 and polymerized sheathing 32. Once third horizontal rail 62 is placed within polymerized sheathing 68, this assembly can then be placed between slip-on fittings 58, 66 and secured in position by knurled set screws 50. Additionally, horizontal rail 52 may be slip fit within polymerized sheathing 56 and secured in slip-on fitting 58 by set screws 50.

Horizontal rails 20 are then slip fit into polymerized sheathing 34 and located preferably at the top edge of vertical rails 12, 14 and corresponding polymerized sheathing 32. Hollaender slip-on fitting 42 is provided with an L-shaped configuration for supporting horizontal rails 20, 22 to vertical rails 12, 19. At the opposite end, slip-on fitting 44 is provided with a T-shaped configuration for intermediate placement of horizontal rails 20, 22 about vertical rails 24, 26. Finally, horizontal rail 54 is slip fit about polymerized sheathing 56 and located between second vertical rails 24, 26 by slip-on structural fittings 60. As is readily shown in FIG. 2, the cart corral assembly of the present invention is easily assembled and disassembled for repositioning or restructuring of the cart corral assembly of the present invention.

Figure 4:
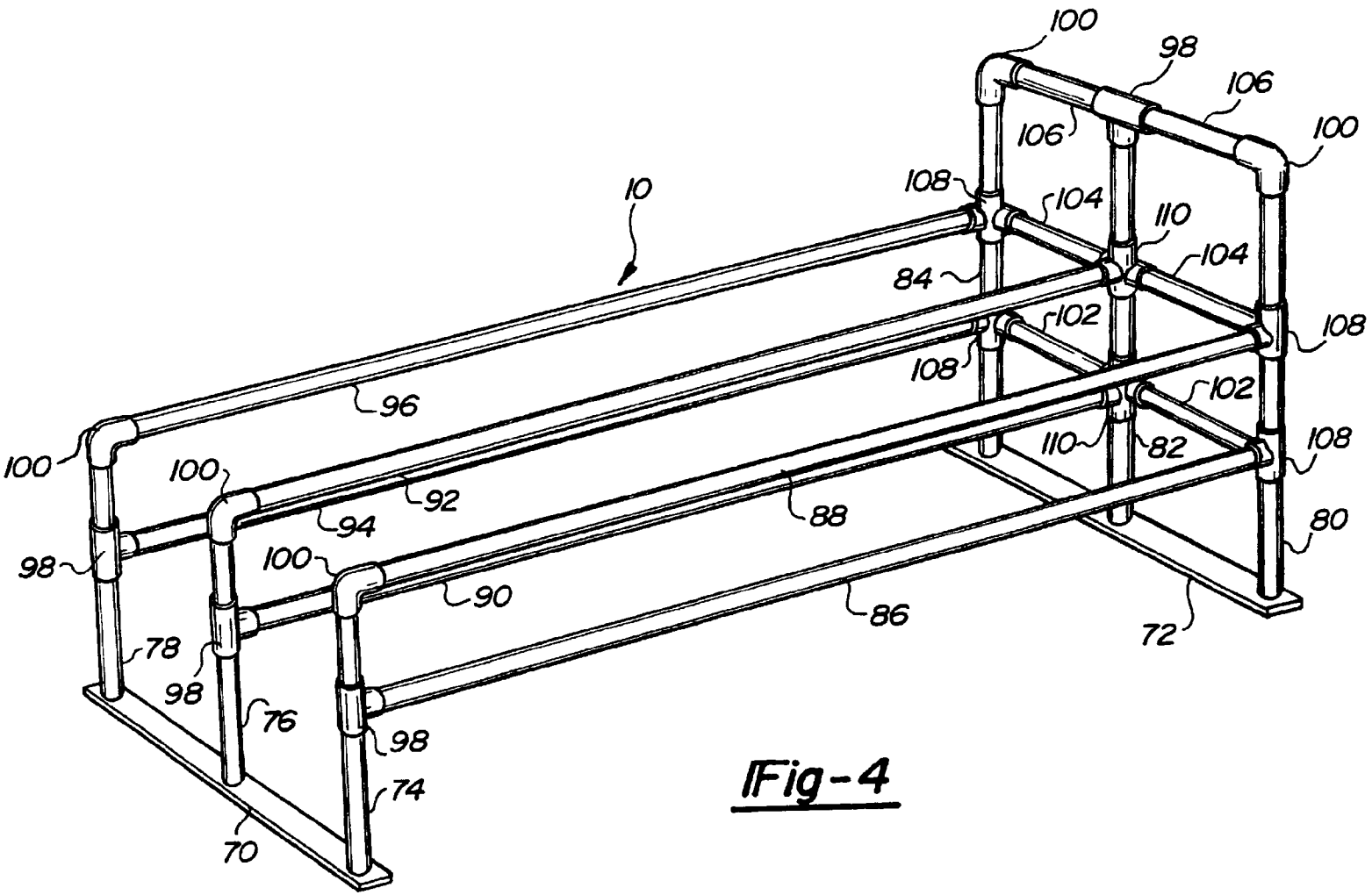
FIG. 4 is a perspective view of a second preferred embodiment of the present invention.

With reference to FIG. 4, a third preferred embodiment is thereshown having additional horizontal and vertical railing for supporting additional carts. Specifically, base 70, 72 is simply an extended version of original base 16, 28 and preferably base 70 has identical tongues extending at a multiplicity of intervals for providing support for multiple vertical rails 74, 76, 78. Correspondingly, base 72 is also preferably fitted with tongues extending at multiple intervals for supporting extended vertical rails 80, 82, 84 in an upright position.

Spaced apart horizontal rails are provided between these corresponding intervals to create two chutes for placing carts. Specifically, spaced apart horizontal rails 86, 88 extend between vertical rails 74, 80. Spaced apart horizontal rails 90, 92 extend between corresponding vertical rails 76, 82 and [space] *spaced* apart horizontal rails 94, 96 extend between corresponding vertical rails 78, 84 to create these chutes.

Extending vertical rails 80, 82, 84 are secured in position and are provided with extra support by additional horizontal rails 102, 104, 106. All horizontal and vertical rails shown in this preferred embodiment are preferably surrounded by polymerized sheathing extending the length of each rail and having an interior diameter equal to or greater than the exterior diameter of each rail. T-shaped slip-on structural fittings 98 and L-shaped slip-on structural fittings 100 are provided for supporting horizontal and vertical rails in their position as is typically described and shown in FIG. 3. Triangled slip-on structural fittings 108 are also provided therewith for positioning and supporting the vertical and horizontal rails as previously described and shown in FIG. 1 at 58 and generally in FIG. 3.

Additionally, a multi angled slip-on structural fitting 110 is provided therewith to secure the central horizontal rails 90, 92 between vertical rails 76, 82 thereby creating the multiple chutes for supporting additional carts. Multi angled slip-on structural fittings 110 are also preferably secured to the corresponding rails as is best shown in FIG. 3.

In a fourth preferred embodiment, and with reference to FIG. 1, horizontal rails 20, 22 with corresponding polymerized sheathing 34 extend from second vertical rails 24, 26 the full length of cart corral assembly 10 and are bent to meet vertical rails 12, 14 at Hollaender slip-on structural fittings 66. This rounded extension of horizontal rails 20, 22 and corresponding polymerized sheathing 34 eliminates slip-on structural fitting 42. Additionally, second vertical rails 24, 26 and corresponding polymerized sheathing 36 preferably extend above slip-on structural fitting 44 and are rounded to form an arcuate shape above slip-on structural fittings 44. This preferred embodiment, therefore, eliminates slip-on structural fittings 60 an additional horizontal rail 54 with corresponding polymerized sheathing 56.

As described above, cart corral assembly 10 may be provided with a multiplicity of additional vertical and horizontal rails to create additional chutes for supporting additional carts.

Preferred materials for use in the present invention include high density polyethylene for the sheathing and Hollaender slip-on structural fittings for assemblage of the cart corral assembly.

The above description is considered that of the preferred embodiments only. Modifications of the invention may occur to those of ordinary skill in the art. Therefore, it is understood that the embodiments shown in the drawings and described above are merely for illustrative purposes and are not intended to limit the scope of the invention.

I claim:

1. A cart corral system comprising:

a first set of at least two spaced apart vertical rails;

a base support supporting said first set of vertical rails in an upright position; said base support extending between said first set of vertical rails;

at least two spaced apart horizontal rails removably engaged with said vertical rails and positioned above said base support [and forming an obtuse angle with said vertical rails];

a second set of at least two spaced apart vertical rails opposite of said first set of vertical rails and removably engaged with said horizontal rails;

each of said vertical and horizontal rails having an outer diameter and exterior profile;

a second base support supporting said second set of vertical rails in an upright position; said second base support extending between said second set of vertical rails;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails; and separable means for attaching said horizontal rails to said vertical rails.

2. The invention defined in claim 1, said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

3. The invention as defined in claim 1, said means for separable attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

4. The invention as defined in claim 1 and further comprising a third horizontal rail removably engaged with and extending between said second set of vertical rails at an angle to said at least two horizontal rails;

said third horizontal rail positioned above said second base support, said third horizontal rail having an outer diameter and an exterior profile;

a removable and replaceable polymerized sheathing surrounding said third horizontal rail having an interior and exterior diameter, the interior diameter equal to or greater than the outer diameter of said third horizontal rail and extending the length of said third horizontal rail; and means for removably engaging said third horizontal rail to said second set of vertical rails.

5. The invention as defined in claim 4, said separable means for attaching said third horizontal rail to said vertical rails comprising a tri-angled member formed of polymerized sheathing and having a hollow interior;

wherein each leg of said tri-angled member extends simultaneously in planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

6. The invention defined in claim 4, said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical stanchion; said interior profile having a diameter equal to or greater than the exterior diameter of said polymerized sheathing surrounding each of said horizontal rails and said vertical rails.

7. The invention as defined in claim 4, said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

8. The invention as defined in claim 1 and further comprising a fourth horizontal rail removably engaged with and extending between one of said sets of vertical rails at an angle to said at least two horizontal rails;

said fourth horizontal rail positioned above one of said first and second base supports and having an outer diameter;

a removable and replaceable polymerized sheathing surrounding said fourth horizontal rail having an interior diameter equal to or greater than the outer diameter of said horizontal rail and extending the length of said horizontal rail.

9. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails.

10. The invention defined in claim 9, said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical stanchion; said interior profile having a diameter equal to or greater than the exterior diameter of said polymerized sheathing surrounding each of said horizontal rails and said vertical rails.

11. The invention as defined in claim 9, said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

12. The invention as defined in claim 9, and further comprising a third horizontal rail removably engaged with and extending between said [second set] second set of vertical rails at an angle to said at least two horizontal rails, said separable means for attaching said horizontal rails to said vertical rails comprising a tri-angled member formed of polymerized sheathing and having a hollow interior;

wherein each leg of said tri-angled member extends simultaneously in planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

13. The invention as defined in claim 9, said separable means for attaching additional horizontal and vertical rails to said first and said second set of vertical rails comprising a quad-angled member formed of polymerized sheathing and having a hollow interior;

wherein each leg of said quad-angled member extends simultaneously in planes to support said additional horizontal rail and vertical rails to said first and said second set of vertical rails;

said interior having a diameter equal to or greater than the exterior diameter of said polymerized sheathing surrounding each of said first and said second set of vertical rails.

14. The invention as defined in claim 9, said separable means for attaching additional horizontal and vertical rails to said first and said second set of vertical rails comprising a multi-angled member formed of polymerized sheathing and having a hollow interior;

wherein each leg of said multi-angled member extends simultaneously in multiple planes to support said additional horizontal rail and vertical rails to said first and said second set of vertical rails;

said interior having a diameter equal to or greater than the exterior diameter of said polymerized sheathing surrounding each of said first and said second set of vertical rails.

15. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

a third horizontal rail extending between said third set of at least two spaced apart vertical rails said horizontal rail having an outer diameter;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails.

16. The invention defined in claim 15, said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical stanchion; said interior profile having a diameter equal to or greater than the exterior diameter of said polymerized sheathing surrounding each of said horizontal rails and said vertical rails.

17. The invention as defined in claim 15, said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

18. The invention as defined in claim 15, said separable means for attaching said horizontal rails to said vertical rails comprising a tri-angled member formed of polymerized sheathing and having a hollow interior;

wherein each leg of said tri-angled member extends simultaneously in planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

19. The invention as defined in claim 15, said separable means for attaching said horizontal rails and said third set of vertical rails to said first and said second set of vertical rails comprising a quad-angled member formed of polymerized sheathing and having a hollow interior;

wherein each leg of said quad-angled member extends simultaneously in planes to support said third horizontal rail and said third set of vertical rails to said first and said second set of vertical rails;

said interior having a diameter equal to or greater than the exterior diameter of said polymerized sheathing surrounding each of said first and said second set of vertical rails.

20. The invention as defined in claim 15, said separable means for attaching said third horizontal rail and said third set of vertical rails to said first and said second set of vertical rails comprising a multi-angled member formed of polymerized sheathing and having a hollow interior;

wherein each leg of said multi-angled member extends simultaneously in multiple planes to support said horizontal rail and said third set of vertical rails to said first and said second set of vertical rails;

said interior having a diameter equal to or greater than the exterior diameter of said polymerized sheathing surrounding each of said first and said second set of vertical rails.

21. A cart corral system comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails; and separable means for attaching said horizontal rails to said vertical rails;

said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

22. The invention as defined in claim 21 and further comprising a fourth horizontal rail removably engaged with and extending between one of said sets of vertical rails at an angle to said at least two horizontal rails;

said fourth horizontal rail positioned above one of said base supports;

a removable and replaceable polymerized sheathing surrounding said fourth horizontal rail having an interior diameter equal to or greater than the outer diameter of said horizontal rail and extending the length of said horizontal rail.

23. A cart corral system comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the lenght of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails; and separable means for attaching said horizontal rails to said vertical rails;

said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

24. A cart corral system comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails; and a third horizontal rail removably engaged with and extending between said second set of vertical rails at an angle to said at least two horizontal rails;

said third horizontal rail positioned above said second base support;

a removable and replaceable polymerized sheathing surrounding said third horizontal rail having an interior diameter equal to or greater than the outer diameter of said third horizontal rail and extending the length of said third horizontal rail; and means for removably engaging said horizontal rails to said vertical rails;

said means for removably engaging said horizontal rails to said vertical rails comprising a tri-angled member formed of polymerized sheathing and having a hollow interior;

wherein each leg of said tri-angled member extends simultaneously in planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

25. The invention defined in claim 24, said means for removably engaging said horizontal rails to said vertical rails comprising a T-shaped member formed of polymerized sheathing and having a hollow interior;

wherein each leg of said T-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

26. The invention as defined in claim 24, said means for removably engaging said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

27. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails;

said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

28. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails;

said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

29. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails;

said separable means for attaching said horizontal rails to said vertical rails comprising a tri-angled member formed of polymerized sheathing and having a hollow interior;

wherein each leg of said tri-angled member extends simultaneously in three planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

30. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails;

said separable means for attaching additional horizontal and vertical rails to said first and said second set of vertical rails comprising a quad-angled member formed of polymerized sheathing and having a hollow interior;

wherein each leg of said quad-angled member extends simultaneously in planes to support said additional horizontal rail and vertical rails to said first and said second set of vertical rails;

said interior having a diameter equal to or greater than the exterior diameter of said polymerized sheathing surrounding each of said first and said second set of vertical rails.

31. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails;

a second base support supporting said second set of vertical rails in an upright position; said second base support extending between said second set of vertical rails;

each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails;

separable means for attaching additional vertical rails to said first and said second base supports comprising a base support extending from said first and second base supports; and separable means for attaching additional horizontal and vertical rails to said first and said second set of vertical rails;

said separable means for attaching additional horizontal and vertical rails to said first and said second set of vertical rails comprising a multi-angled member formed of polymerized sheathing and having a hollow interior;

wherein each leg of said multi-angled member extends simultaneously in multiple planes to support said additional horizontal rail and vertical rails to said first and said second set of vertical rails;

said interior having a diameter equal to or greater than the exterior diameter of said polymerized sheathing surrounding each of said first and said second set of vertical rails.

32. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

a third horizontal rail extending between the third set of at least two spaced apart vertical rails, each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails;

said separable means for attaching said horizontal rails to said vertical rails comprising a T-shaped member formed of polymerized sheathing and having a hollow interior;

wherein each leg of said T-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

33. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

a third horizontal rail extending between the third set of at least two spaced apart vertical rails, each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails;

said separable means for attaching said horizontal rails to said vertical rails comprising an L-shaped member formed of polymerized sheathing and having a hollow interior;

wherein each leg of said L-shaped member has an interior profile identical to the exterior profile of said horizontal rails and said vertical rails; said interior profile having a diameter equal to or greater than the exterior diameter of said polymerized sheathing surrounding each of said horizontal rails and said vertical rails.

34. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

a third horizontal rail extending between the third set of least two spaced apart vertical rails, each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails;

said separable means for attaching said horizontal rails to said vertical rails comprising a tri-angled member formed of polymerized sheathing and having a hollow interior;

wherein each leg of said tri-angled member extends simultaneously in planes to support said third horizontal rail to said vertical rails and said at least two spaced apart horizontal rails;

said interior having a diameter equal to or greater than the exterior diameter of said polymerized sheathing surrounding each of said horizontal rails and said vertical rails.

35. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

a third horizontal rail extending between the third set of at least two spaced apart vertical rails, each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails;

said separable means for attaching said horizontal rails and said third set of vertical rails to said first and said second set of vertical rails comprising a quad-angled member formed of polymerized sheathing and having a hollow interior;

wherein each leg of said quad-angled member extends simultaneously in planes to support said horizontal rail and said third set of vertical rails to said first and said second set of vertical rails;

said interior having a diameter equal to or greater than the exterior diameter of said polymerized sheathing surrounding each of said first and said second set of vertical rails.

36. A maintenance free cart corral system for storing grocery carts, the cart corral system is capable of being readily assembled and disassembled comprising:

a first set of at least two spaced apart vertical rails;

a first base support supporting said first set of vertical rails in an upright position; said first base support extending between said first set of vertical rails;

at least two spaced apart horizontal rails removably engaged with said vertical rails and positioned above said first base support [and forming an obtuse angle with said vertical rails];

a second set of at least two spaced apart vertical rails opposite of said first set of vertical rails and removably engaged with said horizontal rails; wherein said spaced apart vertical rails extend toward each other to form an archway having a singular rail;

a second base support supporting said second set of vertical rails in an upright position; said second base support extending between said second set of vertical rails;

said spaced apart horizontal rails extending from said second set of vertical rails toward said first set of vertical rails and forming part of said first set of vertical rails;

a third set of at least two spaced apart vertical rails offset from said first and said second set of at least two spaced apart vertical rails;

said third set of vertical rails being supported between said first and said second base supports;

a third horizontal rail extending between the third set of at least spaced apart vertical rails, each of said vertical and horizontal rails having an outer diameter and exterior profile;

removable and replaceable polymerized sheathing surrounding each of said vertical rails having an interior and exterior diameter, the interior diameter equal to or greater than the outer diameter of said vertical rails and extending the length of said vertical rails;

removable and replaceable polymerized sheathing surrounding each of said horizontal rails having an interior and exterior diameter, the interior diameter equal to or greater than the outer diameter of each of said horizontal rails and extending the length of said horizontal rails;

separable means for attaching said horizontal rails to said vertical rails; and separable means for attaching said horizontal rails and said third set of vertical rails to said first and said second set of vertical rails;

said separable means for attaching said horizontal rails and said third set of vertical rails to said first and said second set of vertical rails comprising a multi-angled member formed of polymerized sheathing and having a hollow interior;

wherein each leg of said multi-angled member extends simultaneously in multiple planes to support said horizontal rail and said third set of vertical rails to said first and said second set of vertical rails;

said interior having a diameter equal to or greater than the exterior diameter of said polymerized sheathing surrounding each of said first and said second set of vertical rails.

* * * * *